(12) United States Patent
Kolev

(10) Patent No.: US 9,682,369 B2
(45) Date of Patent: Jun. 20, 2017

(54) SHAPED ARTICLES FOR NUCLEAR REMEDIATION AND METHODS FOR FORMING SUCH SHAPED ARTICLES

(71) Applicant: UOP LLC, Des Plaines, IL (US)

(72) Inventor: Evgeny Todorov Kolev, Arlington Heights, IL (US)

(73) Assignee: UOP LLC, Des Plaines, IL (US)

( * ) Notice: Subject to any disclaimer, the term of this patent is extended or adjusted under 35 U.S.C. 154(b) by 428 days.

(21) Appl. No.: 14/292,563

(22) Filed: May 30, 2014

(65) Prior Publication Data

US 2015/0343435 A1    Dec. 3, 2015

(51) Int. Cl.
*B01J 39/08*    (2017.01)
*B01J 39/09*    (2017.01)

(52) U.S. Cl.
CPC .............. *B01J 39/085* (2013.01); *B01J 39/09* (2017.01)

(58) Field of Classification Search
CPC ............................................ B01J 39/00–49/00
See application file for complete search history.

(56) References Cited

U.S. PATENT DOCUMENTS

| | | |
|---|---|---|
| 4,749,518 A | 6/1988 | Davis, Jr. |
| 4,902,392 A | 2/1990 | Aufdembrink et al. |
| 5,106,803 A * | 4/1992 | Mohr ........................ B01J 29/62 502/66 |
| 5,667,695 A | 9/1997 | Bedard et al. |
| 5,925,284 A | 7/1999 | Sherman et al. |
| 6,190,562 B1 * | 2/2001 | Kulprathipanja ...... B01D 15/00 210/670 |
| 6,268,307 B1 * | 7/2001 | DeFilippi ............... B01J 39/085 423/598 |
| 6,479,427 B1 | 11/2002 | Anthony et al. |
| 6,579,460 B1 * | 6/2003 | Willis ..................... B01J 39/02 210/483 |
| 6,814,871 B1 * | 11/2004 | Bem ....................... B01J 39/10 210/660 |
| 9,150,436 B2 * | 10/2015 | Lewis ...................... C02F 1/42 |

* cited by examiner

*Primary Examiner* — Erin Snelting

(57) ABSTRACT

Shaped articles and methods for forming shaped articles are provided. In one embodiment, a method for forming a shaped article includes providing a hydroxy metal oxide binder precursor in a solution of hydroxy metal oxide binder precursor. The method mixes a primary ion exchange composition with the solution of hydroxy metal oxide binder precursor. Further, the method mixes a solid with the solution of hydroxy metal oxide binder precursor. The method includes converting the hydroxy metal oxide binder precursor to a hydroxy metal oxide binder. Also, the method includes forming the shaped article from the primary ion exchange composition, the hydroxy metal oxide binder, and the solid.

13 Claims, 1 Drawing Sheet

SHAPED ARTICLES FOR NUCLEAR REMEDIATION AND METHODS FOR FORMING SUCH SHAPED ARTICLES

TECHNICAL FIELD

The technical field generally relates to shaped articles for nuclear remediation and to methods for forming such articles, and more particularly relates to shaped articles and methods for forming such articles with tunable ion uptake capacity.

BACKGROUND

Ion exchange compositions are well known and include molecular sieves, clays, and non-porous inorganic oxides. These compositions are typically synthesized as powders and formed into shaped articles, such as beads, extrudates, pellets, pills, and the like, in order to be commercially useful. When formed into its final shape, the articles must possess sufficient physical strength to withstand abrasion or attrition and fracture during use, loading and transit.

In forming such shaped articles a binder or matrix material is often used, which can provide strength yet will not interfere with the properties of the ion exchange composition. Commonly used matrix materials or binders include aluminas and clays since these materials can be mixed easily with the ion exchange compositions and can be formed into shaped articles easily by using techniques such as extrusion. However, the extrusion processing necessary to form sufficiently strong shaped articles using alumina and clay binders is performed at temperatures that cause deactivation of certain ion exchange compositions. In order to avoid high temperature processing, liquid solutions of zirconium or titanium salts have been used to bind the ion exchange composition with zirconium or titanium oxides.

Thus, typical processes for forming shaped articles include forming a single ion exchange composition, typically highly active toward a desired ion species, with a zirconium or titanium binder. Generally, the shaped articles are primarily formed from the active ion exchange composition, such as with an ion exchange composition content of over 50 weight percent (wt %). Such shaped articles typically have a binder content of less than 50 wt %. These parameters provide little flexibility in tuning the ion uptake capacity of shaped articles.

Accordingly, it is desirable to provide improved shaped articles and improved methods for forming shaped articles. Further, it is desirable to provide shaped articles and methods for forming shaped articles with tunable ion uptake capacity. Furthermore, other desirable features and characteristics will become apparent from the subsequent detailed description and the appended claims, taken in conjunction with the accompanying drawings and the foregoing technical field and background.

BRIEF SUMMARY

Shaped articles and methods for forming shaped articles are provided. In one embodiment, a method for forming a shaped article includes providing a hydroxy metal oxide binder precursor in a solution of hydroxy metal oxide binder precursor. The method mixes a primary ion exchange composition with the solution of hydroxy metal oxide binder precursor. Further, the method mixes a solid with the solution of hydroxy metal oxide binder precursor. The method includes converting the hydroxy metal oxide binder precursor to a hydroxy metal oxide binder. Also, the method includes forming the shaped article from the primary ion exchange composition, the hydroxy metal oxide binder, and the solid.

In another embodiment, a method for forming a shaped article includes mixing a liquid hydroxy metal oxide binder precursor, a primary ion exchange composition and a solid. The method converts the liquid hydroxy metal oxide binder precursor to a hydroxy metal oxide binder. Further, the method forms the shaped article from the primary ion exchange composition, the hydroxy metal oxide binder, and the solid, wherein the shaped article has a primary ion exchange composition content of from about 2 wt % to about 50 wt %, based on a total weight of the shaped article.

In accordance with another exemplary embodiment, a shaped article is provided. The shaped article includes a primary ion exchange composition. The shaped article has a primary ion exchange composition content of from about 2 wt % to about 50 wt % based on the total weight of the shaped article. The shaped article further includes a hydroxy metal oxide binder.

BRIEF DESCRIPTION OF THE DRAWINGS

Embodiments of shaped articles and methods for forming shaped articles will hereinafter be described in conjunction with the following drawing figures wherein.

DETAILED DESCRIPTION

Figure 1:
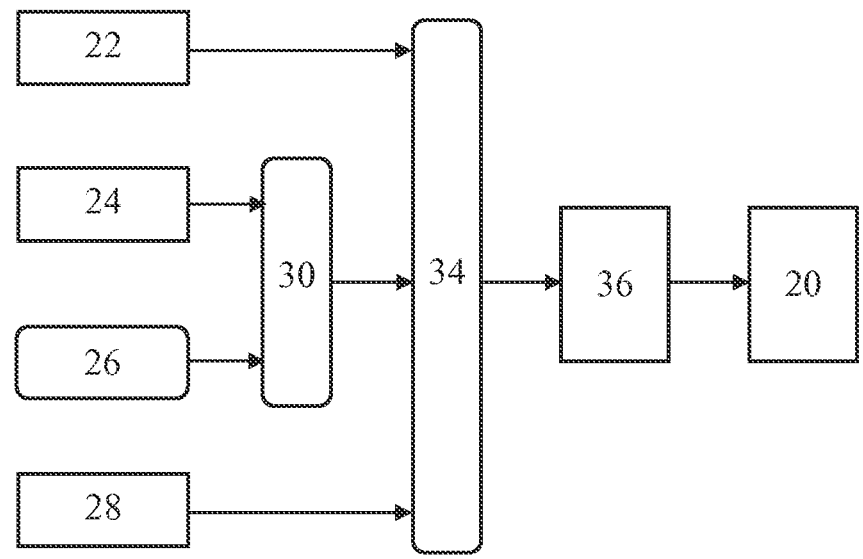
FIG. 1 is a schematic diagram of a method for forming a shaped article in accordance with an embodiment.

The following detailed description is merely exemplary in nature and is not intended to limit the shaped articles or the methods for forming shaped articles. Furthermore, there is no intention to be bound by any theory presented in the preceding background or the following detailed description.

As described herein, shaped articles are provided for nuclear remediation through ion exchange. Specifically, the shaped articles are formed with selected amounts of ion exchange compositions. As used herein, "ion exchange composition" refers to a composition that is able to selectively exchange an ion present in its structure for one in a feed stream that contacts the ion exchange composition. In certain embodiments, the ion exchange composition is formed to selectively remove cesium ions, strontium ions, and/or other ions of interest from a feed stream, such as a stream for nuclear remediation. Exemplary shaped articles described herein are provided with a selected amount of an ion exchange composition or of ion exchange compositions to provide a desired level of ion exchange activity. Further, the methods provided herein allow for tuning the ion uptake capacity of the shaped article through the use of limited amounts of primary ion exchange compositions, such as below 50 wt % of primary ion exchange compositions, and/or inclusion of secondary ion exchange compositions.

An exemplary shaped article includes no more than about 50 wt % of a primary ion exchange composition, based on the total weight of the shaped article. For example, the shaped article may include from about 2 wt % to about 50 wt % of the primary ion exchange composition, such as from about 10 wt % to about 40 wt % of the primary ion exchange composition, based on the total weight of the shaped article. In certain embodiments, the shaped article may include from about 20 wt % to about 35 wt %, such as from about 25 wt % to about 30 wt %, of the primary ion exchange composition, based on the total weight of the shaped article. An exemplary shaped article may comprise or consist of less than about 50 wt %, less than about 40 wt %, less than about 30 wt %, less than about 20 wt %, less than about 10 wt %, or less than about 5 wt %, of the primary ion exchange composition, based on the total weight of the shaped article.

Exemplary primary ion exchange compositions may include, without limitation, a metallotitanate, a metallogermanate, a pillared clay, and/or a metal phosphonate. Examples of metallotitanates include silicotitanates and substituted silicotitanates. For example, the primary ion exchange compositions may be crystalline silicotitanates (CST) or derivatives or modifications thereof such as substituted crystalline silicotitanates (sCST). Ion exchange compositions may also be formed from pillared clays, which are expandable clays that contain pillars between the clay layers. Examples of clays that have ion exchange capacity and can be pillared include montmorillonite, sauconite, nontronite, saponite and hectorite. The pillars may include aluminum chlorhydroxide having a rare earth or zirconium.

An exemplary shaped article further includes a hydroxy metal oxide binder. "Hydroxy metal oxide" refers to an oxide having the empirical formula $MO_2.xH_2O$ where x ranges from about 2 to about 4 and M is zirconium, titanium, or mixtures thereof. The hydroxy metal oxide is x-ray amorphous or poorly crystalline. In an exemplary embodiment, the shaped article includes from about 10 wt % to about 50 wt % of the hydroxy metal oxide binder, based on the total weight of the shaped article. For example, the shaped article may include from about 20 wt % to about 40 wt % of the hydroxy metal oxide binder, based on the total weight of the shaped article. In certain embodiments, the shaped article may include from about 30 wt % to about 40 wt % of the hydroxy metal oxide binder, based on the total weight of the shaped article.

An exemplary shaped article further includes a secondary ion exchange component. The secondary ion exchange component may be selected for removal of desired ions from a stream. For example, if a shaped article is desired for the removal of strontium ions, then the secondary ion exchange component may be Zeolite 4A. Zeolite 4A has the following formula: $Na_2O:[AlO_2]_{12}:[SiO_2]_{12}:[H_2O]_{27}$. Alternatively, the shaped article may be desired to removal cesium ions. For cesium ion removal, the exemplary shaped article may include a chabazite-type or chabazite-eronite-type zeolite as the secondary ion exchange composition. An exemplary chabazite-type zeolite is $(K_2O,Na_2O,MgO,CaO)[(Al_2O_3)(SiO_2)_{4-6}].zH_2O$. In an exemplary embodiment, the shaped article includes from about 10 wt % to about 50 wt % of the secondary ion exchange composition. For example, the shaped article may include from about 20 wt % to about 40 wt % of the secondary ion exchange composition. In certain embodiments, the shaped article may include from about 30 wt % to about 40 wt % of the secondary ion exchange composition.

In an exemplary embodiment, the shaped article comprises or consists of a primary ion exchange composition, a hydroxy metal oxide binder, and a secondary ion exchange composition. As a result, the shaped article may be provided with a tuned activity with regard to ions for removal. Specifically, a shaped article including 30 wt % sCST as a primary ion exchange composition will exhibit half as much activity toward specified ions in comparison to a shaped article including 60 wt % sCST. Adding a controlled amount of a secondary ion exchange composition, such as chabazite-type zeolite, provides for a selected activity toward cesium ions. In an exemplary embodiment, the shaped article comprises or consists of from about 2 wt % to about 50 wt % of the primary ion exchange composition, from about 10 wt % to about 50 wt % of the hydroxy metal oxide binder, and from about 10 wt % to about 50 wt % of the secondary ion exchange composition. For example, the shaped article may comprise or consist of from about 2 wt % to about 40 wt % of the primary ion exchange composition, from about 20 wt % to about 50 wt % of the hydroxy metal oxide binder, and from about 20 wt % to about 50 wt % of the secondary ion exchange composition. In certain embodiments, the shaped article may comprise or consist of from about 25 wt % to about 30 wt % primary ion exchange composition, from about 30 wt % to about 40 wt % of the hydroxy metal oxide binder, and from about 30 wt % to about 40 wt % of the secondary ion exchange composition.

In other embodiments, the shaped article may include additional or alternative components. For example, the shaped article may be intended for use in extreme pH conditions, whether highly acidic or highly basic. Such conditions may pose stability issues for secondary ion exchange compositions including zeolites. Thus, an exemplary shaped article may instead include active or inactive filler. Exemplary inactive fillers are oxides of zirconium, titanium and mixtures thereof. An exemplary shaped article may include from about 10 wt % to about 50 wt % of inactive filler. For example, the shaped article may include from about 20 wt % to about 40 wt % of the inactive filler. In certain embodiments, the shaped article may include from about 30 wt % to about 40 wt % of the inactive filler.

In an exemplary embodiment, the shaped article comprises or consists of a primary ion exchange composition, a hydroxy metal oxide binder, and an active-modified (or activated) filler. Active-modified fillers may include niobium-modified or antimony-modified fillers, such as zirconium oxide or titanium oxide. The shaped article may comprise or consist of from about 2 wt % to about 50 wt % of the primary ion exchange composition, from about 10 wt % to about 50 wt % of the hydroxy metal oxide binder, and from about 10 wt % to about 50 wt % of the active-modified filler. For example, the shaped article may comprise or consist of from about 2 wt % to about 40 wt % of the primary ion exchange composition, from about 20 wt % to about 50 wt % of the hydroxy metal oxide binder, and from about 20 wt % to about 50 wt % of the active-modified filler. In certain embodiments, the shaped article may comprise or consist of from about 25 wt % to about 30 wt % primary ion exchange composition, from about 30 wt % to about 40 wt % of the hydroxy metal oxide binder, and from about 30 wt % to about 40 wt % of the active-modified filler. In certain embodiments, the shaped article comprises of both inactive filler and active-modified filler.

In order to provide for further control of activity of the shaped article, the hydroxy metal oxide binder may be modified to act as an active phase for ion exchange. For example, the binder precursor may be modified with antimony or with niobium to form an active-modified hydroxy metal oxide binder precursor such as an antimony-modified hydroxy metal oxide binder precursor and/or a niobium-modified hydroxy metal oxide binder precursor. Such modification results in an active-modified hydroxy metal oxide binder precursor that forms an active-modified hydroxy metal oxide binder exhibiting activity toward strontium ions, such as an antimony-modified hydroxy metal oxide binder or a niobium-modified hydroxy metal oxide binder. A modified hydroxy metal oxide binder precursor may be prepared by mixing a metal chloride solution and an antimony or niobium solution. Then ammonia addition is performed to form a modified metal precipitate. For example, the modified metal may be a zirconium antimonate, a zirconium niobate, a titanium antimonate, or a titanium niobate.

FIG. 1 illustrates an exemplary method 10 for forming the shaped article 20 described above. As shown, the exemplary method 10 mixes four constituents: the primary ion exchange composition 22, a binder precursor 24, a solvent 26, and a solid 28. An exemplary binder precursor 24 that will constitute the hydroxy metal oxide binder is selected from zirconium, titanium and mixtures thereof. Exemplary binder precursors 24 are metal compounds that can form a gel upon change in pH. Examples of the binder precursors 24 that can be used include, but are not limited to, zirconium tetrapropoxide, zirconium acetate solution, zirconyl hydroxychloride, zirconyl oxychloride, zirconyl orthosulfate, zirconyl oxynitrate, and the titanium analogs of the above named compounds. In exemplary embodiments, the binder precursor is a basic precursor, such as a basic zirconyl precursor. For example, the binder precursor may be an alkaline metal zirconium carbonate, ammonium zirconium carbonate, stabilized hydrous zirconia, sodium titanate or the like. The basic precursor may be formed as a sol, i.e., nano-particles of the oxide dispersed in alkaline solution, such as a zirconia sol. The pH range of the basic precursor may be from about 8 to about 14, such as about 9 to about 12. Further, the binder precursor 24 may be modified, such as with antimony or niobium, to an active phase. An exemplary solvent 26 is water. The solid 28 may be a filler that remains unconverted during conversion of the binder precursor 24. For example, the solid may be a secondary ion exchange component in powder form, such as a zeolite. The solid 28 may be an inactive filler, such as zirconium oxide or titanium oxide. The solid 28 may be an active filler, such as an active-modified filler. For example, the solid 28 may be a niobium-modified filler such as niobium-modified or antimony-modified zirconium oxide or niobium-modified or antimony-modified titanium oxide In the exemplary embodiment, the binder precursor 24 and the solvent 26 are mixed to form a precursor solution 30. Then, the precursor solution 30, the primary ion exchange composition 22, in powder form, and the solid 28 in powder form, are mixed to form a mixture 34. The resultant mixture 34 is homogeneously mixed by conventional techniques such as mulling, kneading, shearing, stirring, etc. The solvent may be added to the mixture before or during mixing to obtain the appropriate consistency required for the desired forming means.

The mixture 34 is heated. Upon heating the mixture 34, the binder precursor 24 is converted to a hydroxy metal oxide binder and the mixture 34 forms a slurry 36. The binder precursor 24 undergoes gelation during preparation of the shaped article; therefore, it may be desirable to control the gelation rate of the binder precursors. Failure to control the gelation rate can result in an inhomogeneous mixture of the binders and primary ion exchange composition or result in the binder/primary ion exchange composition mixture being turned into an unworkable mass. For example, a large or drastic shift in pH can occur when a very basic ion exchange composition is mixed with a very acidic binder precursor. Examples of these very basic compositions are alkali silicotitanates, or alkali metallogermantes, while clays are only slightly basic.

If the primary ion exchange composition 22 is too basic and causes premature gelation, it can be treated to reduce its basicity. This can be done by treating the primary ion exchange composition 22 with an acid solution, such as nitric acid or hydrochloric acid, followed by filtration and washing with water. This procedure is carried out until the resultant acid washed ion exchange composition 22 gives a homogeneous and workable slurry 36.

An alternative way to prepare a slurry 36 of the binder precursor 24, the primary ion exchange composition 22, and the solid 28 is to first gel the binder precursor 24 in precursor solution 30 and then mix the precursor solution 30 after gelling with the ion exchange composition 22 and solid 28. Such an embodiment may be of use when the solid 28 is a zeolite. The binder precursor 24 may be gelled by preparing the solvent 26 as an aqueous solution of a base, such as sodium hydroxide or potassium hydroxide, and by mixing the binder precursor 24 with the solvent 26. The resultant gelled precursor solution 30 is filtered before the solid is washed and then mixed with the desired ion exchange composition. When preparing an article using a gelled binder precursor and a very basic ion exchange composition, the ion exchange composition may be optionally treated with an acid.

After obtaining homogeneity, the slurry 36 is formed into a shaped article 20 by forming techniques such as conical screw mixing, extrusion, oil dropping, spray drying, etc. Extrusion techniques generally employ screw extruders and extrusion presses. As mentioned above, the forming techniques will determine how much water, if any, is added to the mixture. Thus, if extrusion is used, then the mixture should be in the form of a dry slurry or dough, whereas if spray drying or oil dropping is used, then enough water needs to be present in order to form a flowable slurry. Alternatively, the mixture 34 is formed into a shaped slurry 36 that is heated to form the shaped article 20 with binder precursor converted to binder.

Having formed a desired shaped article 20, the shaped article 20 is heated at a temperature of from about 85° C. to about 150° C. In certain embodiments, the shaped article may be treated up to about 300° C. to about 350° C. while retaining significant activity. Heating at these low temperatures sets the binder but does not convert it to the oxide. Therefore, a shaped article 20 comprising an ion exchange composition 22, a hydroxy metal oxide binder, and the solid. As noted above, the solid may be a secondary ion exchange component, such as a zeolite, or an inactive or active filler.

Figure 2:
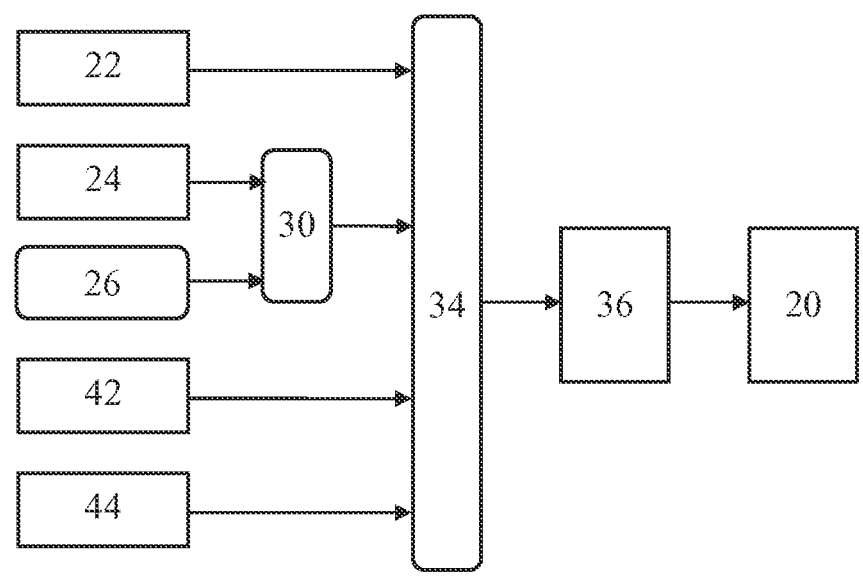
FIG. 2 is a schematic diagram of a method for forming a shaped article in accordance with another embodiment.

FIG. 2 illustrates an alternate embodiment of the method 10. In FIG. 2, the solid 28 is replaced by a first solid 42 and a second solid 44. The first solid 42 may be a secondary ion exchange composition, an inactive filler, or an active-modified filler in powder form. Likewise, the second solid 44 may be a secondary ion exchange composition, an inactive filler, or an active-modified filler in powder form. The method 10 of FIG. 2 is performed similarly to FIG. 1, with the hydroxy metal oxide binder precursor 24 mixed with a solvent 26 to form a precursor solution 30. The precursor solution 30 is then mixed with the primary ion exchange composition 22, the first solid 42 and the second solid 44 to form the mixture 34. The mixture 34 is then heated to form the slurry 36 that is, in turn, processed to form the shaped article 20.

Addition of secondary ion exchange composition or an active-modified filler in powder form as solid 28 to the precursor solution 30 including a liquid form of binder precursor provides for the ability to obtain a shaped article 20 having a tuned ion uptake capacity. Providing a shaped article 20 having such composition allows for a lower primary ion exchange composition content. Such a lower primary ion exchange composition content can be beneficial after ion exchange is performed with the shaped article 20. Specifically, a shaped article having a higher primary ion exchange composition content can experience too high an increase in radioactivity during nuclear remediation such that the loaded shaped article is difficult to handle, transport, dispose of and/or store. As described herein, shaped articles are provided with a tunable capacity for ion exchange with desired ions. As a result, all of the active phase in a shaped article may be used in ion exchange with radioactive ions without resulting in a loaded shaped article that is too highly radioactive. Further, ion exchange with desired species is exothermic and may result in a significant increase in temperature for shaped articles having higher ion exchange composition contents. Therefore, limiting the ion exchange composition content of a shaped article may reduce threat of instability causes by high temperatures.

The shaped articles are useful as selective ion exchangers. Specifically these articles are useful as selective ion exchangers of various contaminant metal ions from liquid streams such as aqueous streams thereby removing these metal ions from the liquid streams. Illustrative of the contaminant metal ions which can be removed from liquid streams are cesium, strontium, mercury, silver, lead, transition metal, lanthanide metal and actinide metal ions. These metal ions can be removed from the liquid stream by contacting the stream with the shaped article for a time sufficient to remove the metal ions and trap them on the article. For example, the article may be placed in a column and the stream to be treated may be flowed through it, usually downflow, until the contaminant metal ion is detected in the effluent of the column. The metal ion containing article can either be disposed of or, if the active phase allows for a significant regeneration, it can be regenerated by eluting with a solvent containing ions that can be exchanged for the trapped metal ions and concentrate the ions in the eluting solvent. As noted above, the shaped articles have a tunable limit for ion exchange such that their exposure to the stream to be treated need not be limited in duration in order to prevent the shaped articles from becoming too highly radioactive.

The shaped articles described herein may perform ion exchange in aqueous, highly acidic, neutral, and highly basic solutions, depending on the selection of their components. Further, the shaped articles described herein may be formed with selective activities toward desired ions. In other words, the shaped articles may be tuned or adjusted to provide any practical level of activity toward ion exchangeable ions, such as strontium and/or cesium ions. The ability to tune activity is provided through the ability to form shaped articles with lower amounts of primary ion exchange compositions, as compared to conventional shaped articles, and with selected amounts of secondary ion exchange compositions and/or active modified binders.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the claimed subject matter in any way. Rather, the foregoing detailed description will provide those skilled in the art with a convenient road map for implementing an exemplary embodiment or embodiments. It being understood that various changes may be made in the function and arrangement of elements described in an exemplary embodiment without departing from the scope set forth in the appended claims.

What is claimed is:

1. A method for forming a shaped article, the method comprising the steps of:

providing a hydroxy metal oxide binder precursor in a solution of hydroxy metal oxide binder precursor;

mixing a primary ion exchange composition with the solution of hydroxy metal oxide binder precursor;

mixing the solution of hydroxy metal oxide binder precursor with a zeolite or an active modified filler;

converting the hydroxy metal oxide binder precursor to a hydroxy metal oxide binder; and forming the shaped article from the primary ion exchange composition, the hydroxy metal oxide binder, and the zeolite or the active modified filler.

2. The method of claim 1 wherein the active modified filler is a niobium modified filler.

3. The method of claim 1 wherein the mixing the solution of hydroxy metal oxide binder precursor with an active modified filler further comprises mixing with a secondary ion exchange composition, and wherein forming the shaped article further comprises the secondary ion exchange composition.

4. The method of claim 1 wherein providing the hydroxy metal oxide binder precursor is a basic precursor in a solution of basic precursor.

5. The method of claim 1 wherein forming the shaped article comprises forming the shaped article with a primary ion exchange composition content of from about 2 wt % to about 50 wt %, based on a total weight of the shaped article.

6. The method of claim 5 wherein forming the shaped article comprises forming the shaped article with a hydroxy metal oxide binder content of from about 10 wt % to about 50 wt %, based on the total weight of the shaped article.

7. The method of claim 6 wherein forming the shaped article comprises forming the shaped article with a zeolite or an active modified filler content of from about 10 wt % to about 50 wt %, based on the total weight of the shaped article.

8. A method for forming a shaped article, the method comprising the steps of:

mixing a liquid hydroxy metal oxide binder precursor, a primary ion exchange composition and a zeolite;

converting the liquid hydroxy metal oxide binder precursor to a hydroxy metal oxide binder; and forming the shaped article from the primary ion exchange composition, the hydroxy metal oxide binder, and the zeolite, wherein the shaped article has a primary ion exchange composition content of from about 2 wt % to about 50 wt %, based on a total weight of the shaped article.

9. The method of claim 8 wherein the liquid hydroxy metal oxide binder precursor is a liquid basic precursor.

10. A method for forming a shaped article, the method comprising the steps of:

mixing a liquid hydroxy metal oxide binder precursor, a primary ion exchange composition and an active-modified filler;

converting the liquid hydroxy metal oxide binder precursor to a hydroxy metal oxide binder; and forming the shaped article from the primary ion exchange composition, the hydroxy metal oxide binder, and the active-modified filler, wherein the shaped article has a primary ion exchange composition content of from about 2 wt % to about 50 wt %, based on a total weight of the shaped article.

11. The method of claim 10 wherein the mixing the liquid hydroxy metal oxide binder precursor, the primary ion exchange composition and the filler further comprises mixing with a secondary ion exchange composition, and wherein the forming the shaped article further comprises the secondary ion exchange composition.

12. The method of claim 10, wherein the active-modified filler is a niobium-modified filler.

13. The method of claim 10, wherein the liquid hydroxy metal oxide binder precursor is a liquid basic precursor.

* * * * *